(12) United States Patent
Costabile et al.

(10) Patent No.: US 12,046,081 B2
(45) Date of Patent: Jul. 23, 2024

(54) SONIC GENERATOR FOR USE WITH A TIMING AND DATA COLLECTION SYSTEM FOR A LIVE SPORTING EVENT

(71) Applicants: Michael Joseph Costabile, Oak Island, NC (US); Dennis Brady Whitley, Cooleemee, NC (US)

(72) Inventors: Michael Joseph Costabile, Oak Island, NC (US); Dennis Brady Whitley, Cooleemee, NC (US)

(73) Assignee: RIGHT TIME SPORTS, LLC., Supply, NC (US)

( * ) Notice: Subject to any disclaimer, the term of this patent is extended or adjusted under 35 U.S.C. 154(b) by 545 days.

(21) Appl. No.: 17/333,784

(22) Filed: May 28, 2021

(65) Prior Publication Data
US 2021/0375070 A1    Dec. 2, 2021

Related U.S. Application Data

(60) Provisional application No. 63/032,290, filed on May 29, 2020.

(51) Int. Cl.
*G07C 1/28* (2006.01)
*G04F 1/00* (2006.01)
*H04B 7/26* (2006.01)
*A63B 71/06* (2006.01)

(52) U.S. Cl.
CPC ............. *G07C 1/28* (2013.01); *G04F 1/005* (2013.01); *H04B 7/26* (2013.01); *A63B 71/0669* (2013.01); *A63B 2225/54* (2013.01); *A63B 2243/0037* (2013.01)

(58) Field of Classification Search
CPC ............................. G07C 1/28; A63B 71/0069
See application file for complete search history.

(56) References Cited

U.S. PATENT DOCUMENTS 4,215,856 A    8/1980   Schmall
2003/0210612 A1*   11/2003   Stern ...................... G04F 10/00
                                                                        368/110

(Continued)

OTHER PUBLICATIONS

Phonebuff, 2012, How To Add Custom Ringtones On Android, Youtube.*

*Primary Examiner* — Renee S Luebke
*Assistant Examiner* — Matthew Hwang
(74) *Attorney, Agent, or Firm* — Dilworth & Barrese, LLP.

(57) ABSTRACT

A sonic generator for use with timing and data collection systems is a button activated device operated by a referee during a live sporting event. It can be hand-held or integrated with a referee's belt pack and replaces a conventional exhalation-powered whistle. It can be configured to record and replay a custom sonic signal, a sonic signal selected from a database of pre-recorded sounds, or a standard sonic signal such as a generic whistle sound. Each sonic generator generates a unique sonic signal which is compared to digitally stored sonic fingerprints at a given sporting event to identify a match, and starts or stops the game clock in response to that match. This prevents inadvertent game clock starts and stops resulting from ambient noise. The sonic generator can be configured as a two-way voice communication system to allow referees to communicate with other game officials.

18 Claims, 5 Drawing Sheets

(56) References Cited

U.S. PATENT DOCUMENTS

| | | | |
|---|---|---|---|
| 2008/0115654 A1* | 5/2008 | Hanuschak | G10H 1/34 |
| | | | 84/602 |
| 2016/0012810 A1* | 1/2016 | Cronin | G08B 7/00 |
| | | | 340/323 R |
| 2016/0096071 A1* | 4/2016 | Ianni | A63B 71/0605 |
| | | | 700/91 |
| 2017/0186414 A1 | 6/2017 | Ellingson | |

\* cited by examiner

SONIC GENERATOR FOR USE WITH A TIMING AND DATA COLLECTION SYSTEM FOR A LIVE SPORTING EVENT

CROSS-REFERENCE TO RELATED APPLICATION

This application claims the benefit of U.S. Provisional Patent application Ser. No. 63/032,290, entitled SONIC GENERATOR FOR USE WITH A TIMING AND DATA COLLECTION SYSTEM FOR A LIVE SPORTING EVENT, and having a filing date of May 29, 2020.

BACKGROUND OF THE INVENTION

Field of the Invention

This invention relates to sports officiating, and more specifically to sonic generators for use with timing and data collection systems, such as those used in basketball games.

Description of the Prior Art

A basketball referee's primary means of communication is arguably their whistle. They use it to indicate a foul has occurred, to start and stop game play, and even to get a player's attention or express emotion or warning. More recently the humble whistle has become a means to automatically trigger a game clock to stop or start, with the official timekeeper serving as a backup. Most recently, systems have been developed that collect and analyze whistle-blowing related data such as who blew their whistle, when they blew it, and where they were when it was blown. This mined data can be analyzed, optionally alongside game footage, for quality control purposes such as establishing game clock adjustments and evaluating referee performance including reaction time and bias.

These aforementioned improvements have been developed by at least one inventor of the present invention and include:
  SPORTS MONITORING AND TRACKING SYSTEM described in U.S. Pat. No. 7,920,052 which issued Apr. 5, 2011 and pertains to specific signal generators, typically whistles, starting and stopping a game timer. This technology essentially negated the interference of background noise to allow specific game whistles to automatically activate the game timer.
  SYSTEM FOR REMOTELY STARTING AND STOPPING A TIME CLOCK IN AN ENVIRONMENT HAVING A PLURALITY OF DISTINCT ACTIVATION SIGNALS described in U.S. Pat. No. 10,504,300 which issued Dec. 10, 2019 and pertains to starting and stopping a game clock with a variety of pre-identified whistles, and collecting data related thereto. This technology essentially improved the SPORTS MONITORING AND TRACKING SYSTEM invention by allowing referees to use their own whistles whose sonic fingerprints had been established, and collecting whistle blowing data on each referee based on those unique fingerprints.
  SYSTEM AND METHOD FOR COLLECTING DATA IN A LIVE SPORTING EVENT described in PCT/US2020/027135 filed Apr. 8, 2020 pertains to communication bundles, hoop sensors and a time clock, all communicatively coupled and configured to collect environmental, biometric and game-related data during a game.

These references are incorporated by reference in their entirety.

While the whistle has been the reliable go-to sonic generator for many years, there are some shortcomings. For one, whistles are extremely unsanitary for the user who continuously puts it into and takes it out of their mouth. It is also potentially harmful to surrounding players, officials and fans who are subjected to flying spittle and released aerosol from whistle blows. Whistles are also less-than-ideal because the sonic fingerprint each whistle generates can vary. For example, two people blowing the same whistle will generate different sonic fingerprints. Moreover, one person blowing one whistle doesn't guarantee a unique and repeated sonic fingerprint because a person doesn't necessarily blow a whistle with the same intensity and duration every time. In short, a whistle is an imperfect sonic generator because of potential health concerns and because of the variations in the resulting sonic fingerprint.

As can be seen, there is a need for an improved sonic generator for use with a timing and data collection system for a live sporting event. It is desirable that this sonic generator does not present any potential health risks to the user or people surrounding the user. It is also desirable that this sonic generator possesses a sonic fingerprint that is unique and repeatable. It is also desirable that this sonic generator is programmable with respect to sound and fingerprints emitted. It is also desirable that this sonic generator is configured for use with timing and data collection systems for live sporting events. It is also desirable that this sonic generator is compact and easy to use. It is also desirable that this sonic generator can be configured to be used as a communication system.

SUMMARY OF THE INVENTION

A sonic generator for use with timing and data collection systems is a button activated device operated by a referee during a live sporting event. It can be hand-held or integrated with a referee's belt pack and replaces a conventional exhalation-powered whistle by emitting a sound and/or RF signal that triggers a corresponding game clock to start or stop.

A sonic generator can include an antenna, battery, condenser microphone, speaker and microcontroller unit. It can be configured to record and replay a custom sonic signal, a sonic signal selected from a database of pre-recorded sounds, or a standard sonic signal such as a generic whistle sound. Each sonic generator generates a unique fingerprint when emitting a sonic signal. That fingerprint can be from the actual sonic signal emitted, i.e. a sonic fingerprint, and/or from a radio signal emitted when the sonic signal is generated, i.e. a generator fingerprint.

During a sporting event each referee's sonic generator is communicatively coupled with a central base station, which is communicatively coupled with a game clock. In this manner each referee can push a button on their respective sonic generator to generate a sonic signal and simultaneously stop or start the game clock.

The sonic generator optionally facilitates voice communication with other officials by receiving and transmitting communications via a shared base station.

DETAILED DESCRIPTION OF THE INVENTION

The following structure numbers refer to the following structures among the various figures:
- 10—Game clock system;
- 11—Hand-held sonic generator;
- 12—Belt pack sonic generator;
- 15—Referee;
- 17—Headset;
- 18—Headset microphone;
- 19—Headset connection wire;
- 20—Button;
- 22—Antenna;
- 23—Headset plug;
- 24—Microcontroller unit;
- 25—Protective case;
- 26—Battery compartment;
- 27—Battery;
- 28—Condenser microphone;
- 29—Speaker;
- 30—Sonic signal;
- 31—RF signal;
- 35—Sonic fingerprint;
- 36—Generator fingerprint;
- 40—Game clock;
- 42—Base station;
- 44—Belt pack;
- 50—Database;
- 60—Voice communication system;
- 62—Radio chip set;
- 71—Voice signal;
- 72—Sonic generator to base station signal;
- 73—Base station to sonic generator signal; and
- 74—Sonic generator to referee signal.

Figure 1:
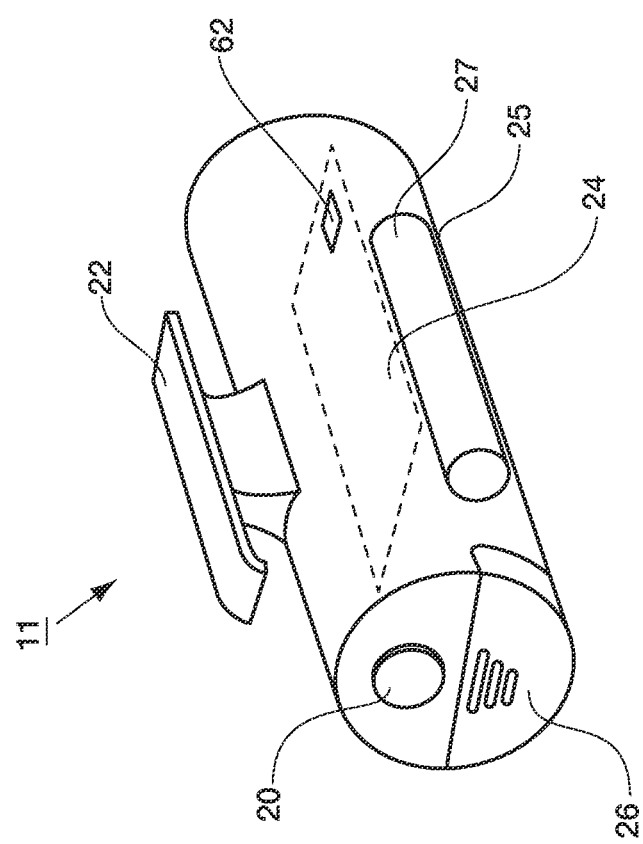
FIGS. 1 and 2 depict a sonic generator embodiment of the present invention shown from different perspectives.
Figure 2:
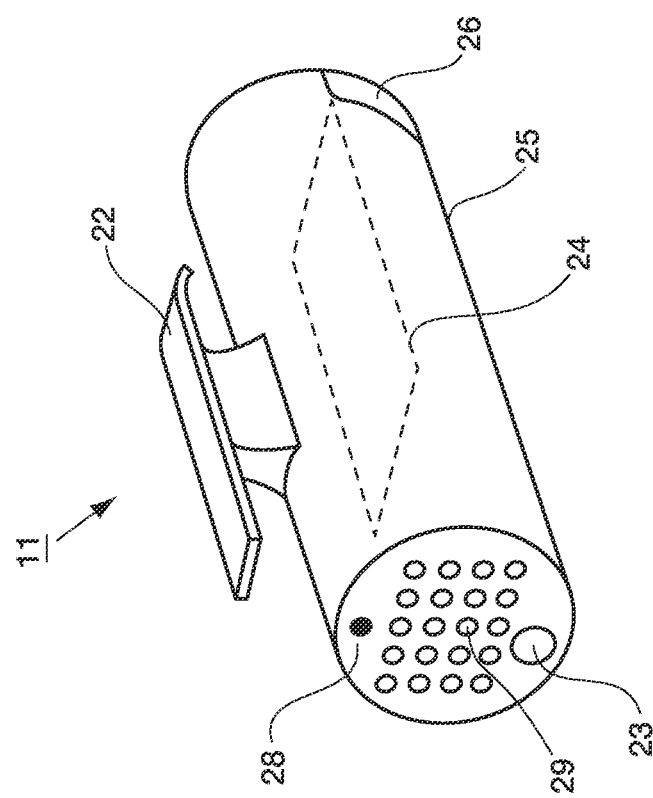

Referring to FIGS. 1 and 2, hand-held sonic generator 11 generally includes protective case 25 surrounding microcontroller unit 24 and battery compartment 26 that preferably houses at least one battery 27, preferably a 3V lithium cell battery. Antenna 22 is configured to transmit and receive signals, preferably radio frequency signals. Hand-held sonic generator 11 includes button 20 and high decibel output speaker 29. One embodiment includes condenser microphone 28. Although a substantially cylindrical device is depicted, it should be understood that the unit can be sized and shaped in a myriad of ways so long as the unit is easily held and operated by one hand.

Figure 3:
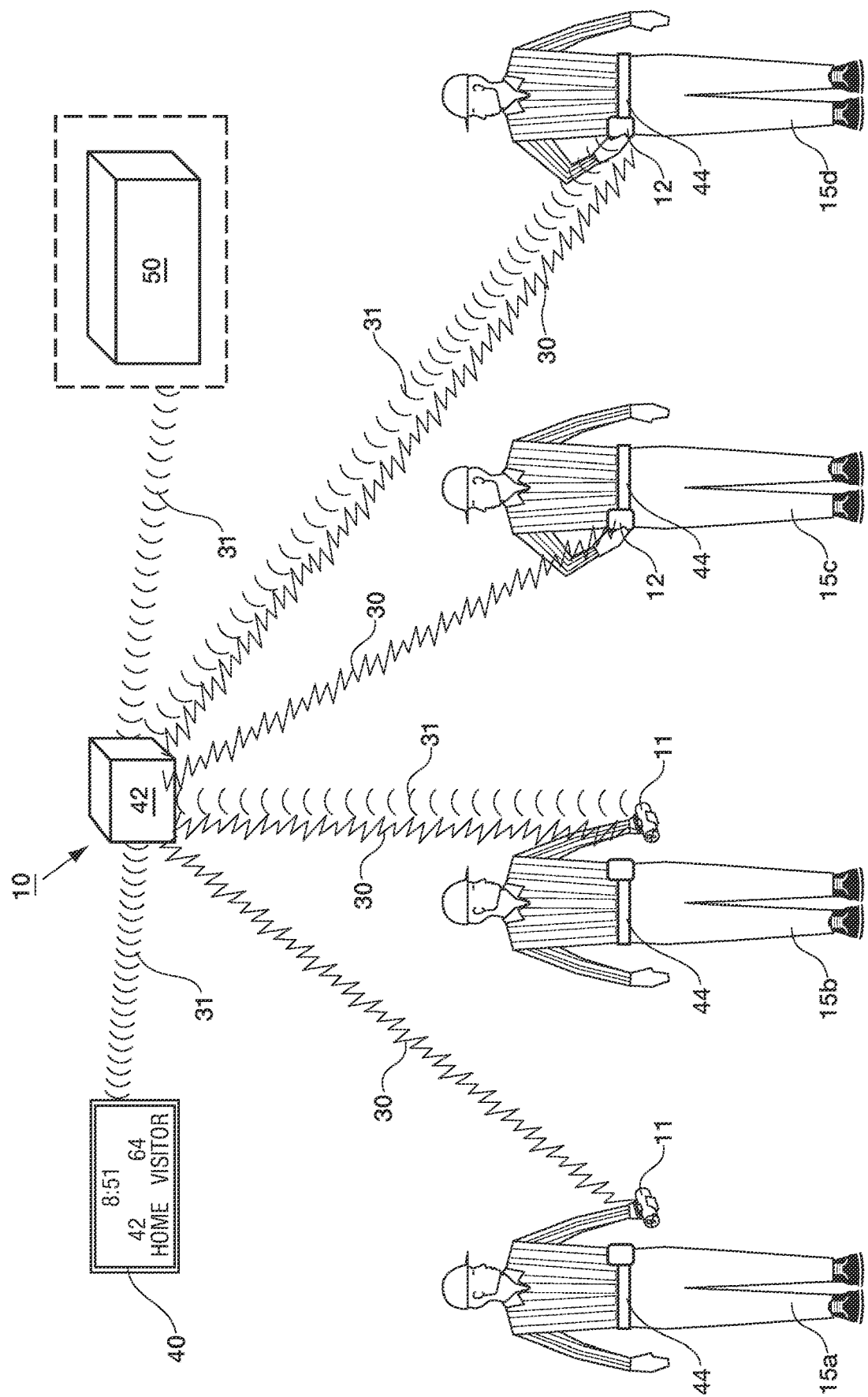
FIG. 3 depicts four referees with four embodiments of the present invention.

Hand-held sonic generator 11 is depicted in FIGS. 1 and 2, but it is within the scope of the invention to integrate the sonic generator's structure and function into a belt pack. Belt-pack sonic generators 12 are discussed in more detail in connection with referees 15c and 15d as shown in FIG. 3. For simplicity hand-held sonic generators 11 will be described herein, but it should be understood that either embodiment, hand-held or belt-pack, can be substituted one for the other.

In one embodiment the sonic generator can be configured for use as voice communication system 60. In this embodiment hand-held sonic generator 11 includes radio chip set 62 for transmitting and receiving voice signals. Radio chip set 62 can be part of microcontroller unit 24 as depicted, or stand-alone within hand-held sonic generator. A voice enabled embodiment of a hand-held sonic generator may also include headset plug 23.

In game clock system 10 of the present invention at least one referee 15 officiating a basketball game is communicatively coupled to a central base station 42, which is communicatively coupled to game clock 40. Central base station 42 is also communicatively coupled to offsite database 50. Central base station 42 has been configured to recognize and authenticate specific signals by comparing signals it receives during a game with signal fingerprints loaded prior to the game. When signals generated during a game match existing signal fingerprints stored in the base station the base station will trigger the game clock to start or stop. In this manner referees can start or stop the clock with their sonic generators, but background noise will not be authenticated and therefore will have no effect on the clock. Signals from referees to start or stop the game clock are emitted from sonic generators of the present invention.

FIG. 3 depicts four referees 15a, 15b, 15c and 15d. For illustration purposes each referee is outfitted with a different embodiment of the present invention.

Figures 4, 5:
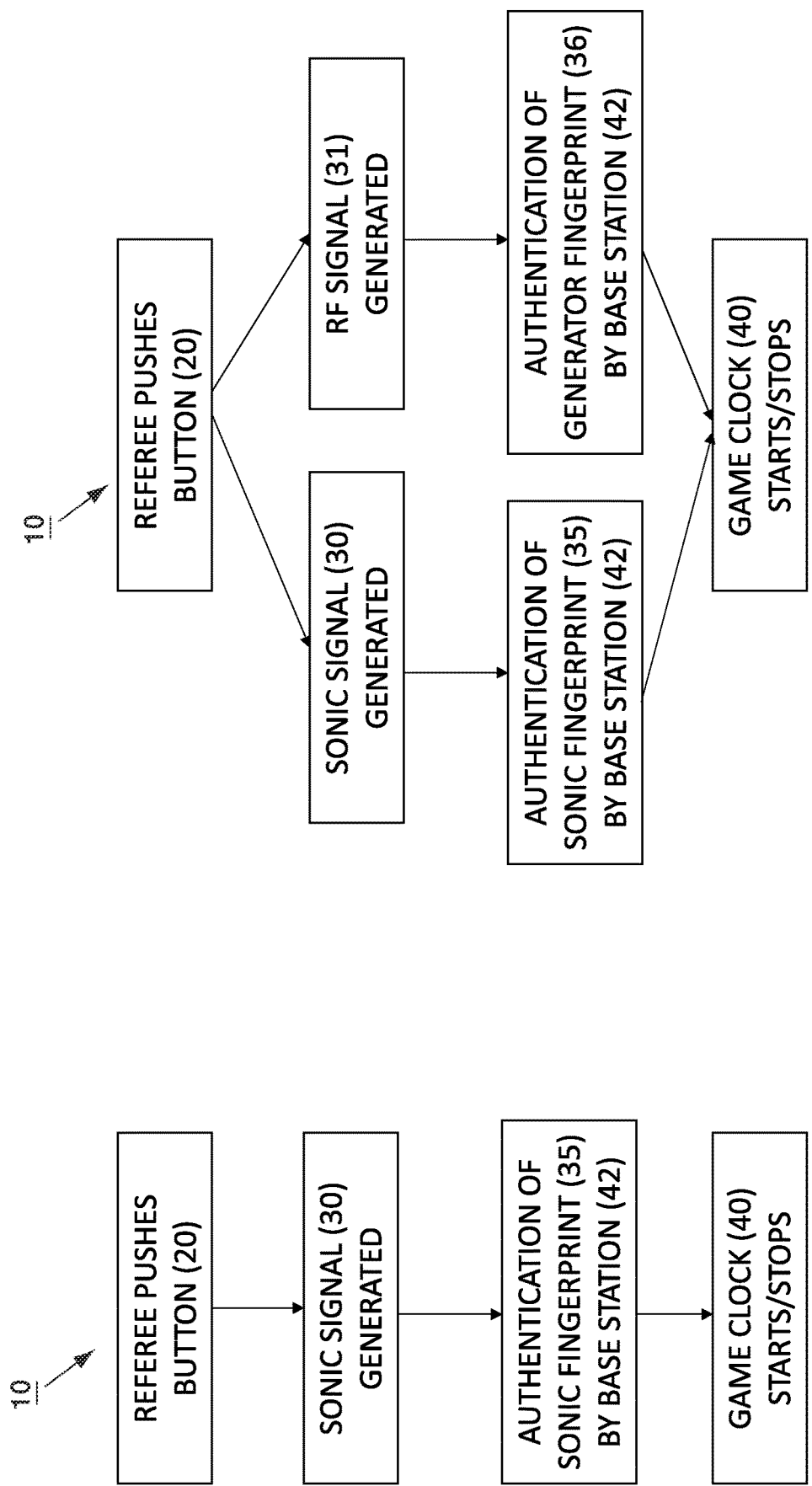
FIG. 4 schematically represents a sonic-signal only scheme.
FIG. 5 schematically represents a sonic signal and RF signal scheme.

Referee 15a has hand-held sonic generator 11, which emits sonic signal 30 upon depression of button 20. Assuming that sonic signal matches a pre-loaded sonic fingerprint 35 (not shown) within base station 42, base station will transmit RF signal 31 to game clock 40 to cause clock to start or stop. This is broadly depicted in FIG. 4.

Referee 15b has hand-held sonic generator 11 that emits both sonic signals 30 and RF signals 31. In this embodiment base station must receive and authenticate both the sonic signal and the RF signal by comparing them to sonic fingerprint 35 (not shown) and generator fingerprint 36 (not shown), respectively. In a preferred embodiment both signals must be authenticated to trigger the game clock. This is broadly depicted in FIG. 5.

Referee 15c has belt pack sonic generator 12, which is functionally the same as hand-held sonic generator 11 held by referee 15a, except components of belt pack sonic generator 12 are integrated with belt pack 44. Similarly, referee 15c presses button 20 to start or stop game clock 40. This is broadly depicted in FIG. 4.

Referee 15d has belt pack sonic generator 12 that is functionally similar to referee 15b's hand-held sonic generator, except integrated with belt pack 44. This is broadly depicted in FIG. 5.

It should be understood that sonic signals 30 depicted in FIG. 3 create an audible sound, and therefore could be heard by players, coaches, officials and spectators.

As described herein, hand-held sonic generators 11 and belt pack sonic generators 12 are functionally the same, and indeed the specific generator that a referee carries may be a matter of personal choice with different officials carrying one or the other in a game.

In one embodiment, sonic generator 11/12 includes condenser microphone 28 which allows each official to record a custom sonic signal on their sonic generator. This custom sonic signal is emitted when the button is pressed. Sonic fingerprint 35 of their custom sonic signal is loaded into base station prior to start of game for signal authentication during the game.

In another embodiment, each sonic generator 11/12 has erasable storage that allows an official to download a pre-recorded sonic signal from a database of pre-existing signals. The corresponding sonic fingerprint of the pre-recorded signal is loaded into the base station prior to start of game for authentication during game.

In yet another embodiment, each sonic generator 11/12 includes a pre-set sonic signal, with the corresponding sonic fingerprint of the pre-set signal loaded into base station for subsequent authentication during game.

Regardless of if the sonic signal is custom, pre-recorded or pre-set, each sonic generator used in a specific game emits a sonic signal with a unique sonic fingerprint. In some embodiments, namely shown with referees 15b and 15c, the generator also emits RF signal 31 with unique generator fingerprint 36 (not shown). In a preferred embodiment the sonic signal sounds like a conventional whistle, but other sounds including horns, beeps, bells and buzzes are all within the scope of the invention.

Figure 6:
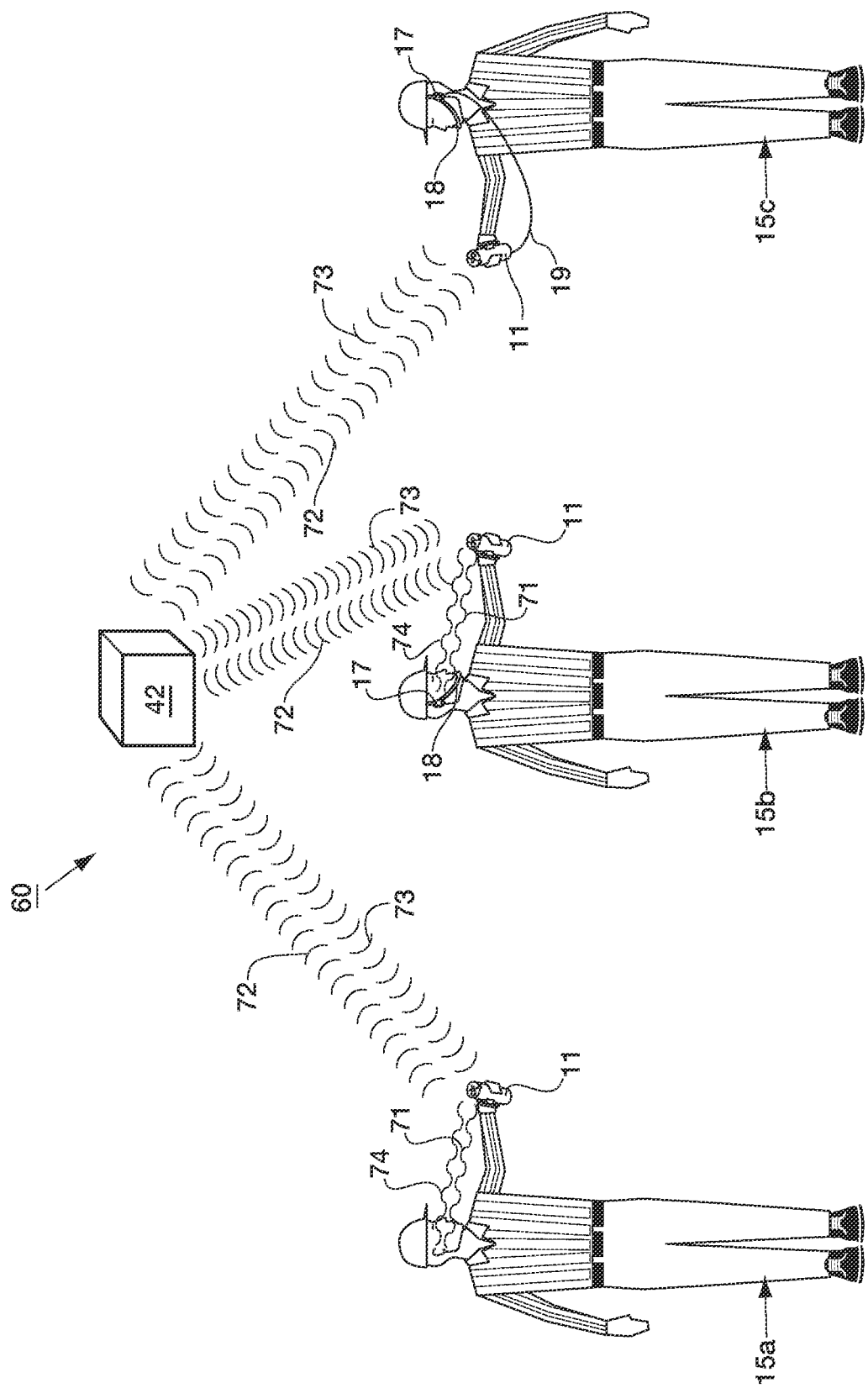
FIG. 6 depicts embodiments of the present invention that facilitate voice communication.

Referring to FIG. 6, a game clock system of the present invention may include voice communication system 60 which allows referee 15 to communicate with game officials such as other referees and/or timekeepers. More specifically a referee generates voice signal 71 by saying something, that signal is transmitted to sonic generator 11, which transmits sonic generator to base station signal 72, which is received by base station 42 and may be further transmitted as appropriate. Conversely base station 42 may transmit messages to referee 15 via base station to sonic generator signal 73, which is received by the sonic generator and transmitted to referee via sonic generator to referee signal 74. This system employs sonic generator embodiments having radio chip set 62 as described herein, and includes various embodiments as depicted by referee 15a, 15b and 15c.

In one embodiment, referee 15a sends voice signal 71 through the airwaves to condenser microphone 28 of sonic generator 11, and that signal is transmitted to base station 42 via base station to sonic generator signal 73. In this embodiment a communication sent to referee 15 would be transmitted from base station 42 to sonic generator 11 via base station to sonic generator signal 73, and speaker 29 of the sonic generator would amplify that communication into the airwaves for referee 15a to hear.

Referee 15b's system differs from referee 15a's system in that referee 15b's system includes headset 17 having headset microphone 18, which is communicatively coupled to sonic generator 11 with a wireless signal system, for example BLUETOOTH.

Referee 15c's system differs from referee 15b's system in that headset 17 of referee 15c's system is communicatively coupled to sonic generator by headset connection wire 19, which plugs into headset plug 23.

It should be understood that voice communication system 60 can employ belt-pack sonic generators 12 in combination with or instead of hand-held sonic generators 11, and that they can be configured in a variety of combinations. Voice communication system 60 is a sub-system of game clock system 10 and integrates into the sonic generator, thereby reducing the quantity and complexity of devices that the referee must handle while officiating a game.

It should also be understood that the foregoing relates to exemplary embodiments of the invention and that modifications may be made without departing from the spirit and scope of the invention as set forth in the following claims. Terms such as "substantially" and the like shall mean within reasonable bounds when considering limitations such as machines, materials, manufacturing methods, and people. By way of example, a "substantially smooth" surface means there are no intentional bumps or irregularities. Any ranges set forth herein include the endpoints as well as all increments there between, even if not specifically stated. By way of example 1 to 2 inches includes 1 inch, 1.000001 inches and so forth. Finally, unless otherwise stated or contrary to common sense, "approximate" and the like shall mean +/−10%.

What is claimed is:

1. A sports timing system comprising:
   A) a game clock;
   B) a base station communicatively coupled to said game clock, said base station storing a plurality of unique sonic signal fingerprints;
   C) a plurality of button-actuated sonic generators each providing a unique sonic signal relative to other said sonic generators of the plurality, said plurality of sonic generators each including a radio chip set for transmitting and receiving voice signals, wherein each sonic generator is communicatively coupled to said base station;
   D) a means to determine a match between said unique sonic signal fingerprints and said unique sonic signals, said means to determine a match being communicatively coupled to said game clock.

2. The sports timing system of claim 1 wherein said means to determine a match is configured to signal said game clock to start or stop in response to said match.

3. The sports timing system of claim 1 wherein said plurality of sonic generators are selected from the group consisting of hand-held sonic generators, belt pack sonic generators and combinations thereof.

4. The sports timing system of claim 1 wherein said plurality of sonic generators are each configured are to emit a unique RF signal relative to other said sonic generators of the plurality.

5. The sports timing system of claim 4 wherein said base station stores a plurality of unique RF signal fingerprints.

6. The sports timing system of claim 5 wherein said means to determine a match is further configured to identify a match between one of said unique RF signal fingerprints and one said unique RF signal.

7. The sports timing system of claim 1 wherein at least one of said plurality of button-actuated sonic generators is communicatively coupled with a headset.

8. A sonic generator for starting and stopping a game clock, said sonic generator including:
   A) a button;
   B) a microcontroller unit configured to generate a sonic signal having a specific sonic fingerprint, said sonic signal generated in response to actuating said button;
   C) a speaker for amplifying said sonic signal;
   D) an antenna configured to transmit said sonic signal to a base station; and
   E) a radio chip set for two-way voice signal communication with said base station.

9. The sonic generator of claim 8 further including a condenser microphone for inputting said sonic signal.

10. The sonic generator of claim 8 further including erasable storage for downloading a pre-recorded sonic signal from a database of pre-existing signals.

11. The sonic generator of claim 8 wherein said sonic signal is pre-set.

12. The sonic generator of claim 8 wherein said radio chip set is communicatively coupled with a headset.

13. The sonic generator of claim 12 wherein said headset is communicatively coupled to said sonic generator.

14. The sonic generator of claim 8 wherein said microcontroller unit is configured to generate an RF signal having a specific RF fingerprint, said RF signal generated in response to actuating said button.

15. A method of starting and stopping a game clock comprising acts of:
   A) configuring a base station to store at least one unique sonic signal fingerprint, said base station being communicatively coupled to a game clock;
   B) configuring a button-actuated sonic generator to transmit a single sonic signal corresponding with exactly one of said unique sonic signal fingerprints, said sonic generator being communicatively coupled with said base station and configured to transmit a voice signal to said base station;
   C) providing a means to determine a match between said unique sonic signal fingerprint and said unique sonic signals, said means to determine a match being communicatively coupled to said base station; and
   D) depressing a button on said sonic generator, wherein the depression of said button starts or stops said game clock if a match between said sonic signal and one of said sonic signal fingerprints is determined by said means to determine a match.

16. The method of claim 15 further including an act of configuring said button-actuated sonic generator to transmit a RF signal.

17. The method of claim 15 further including an act of communicatively coupling a headset to said base station.

18. The method of claim 15 further including an act of configuring a second button-actuated sonic generator to transmit a second single sonic signal corresponding with exactly one of said at least one unique sonic signal fingerprints, said second single sonic signal different from said single sonic signal.

* * * * *